July 1, 1952   H. ST. PIERRE   2,601,883
CROSS CHAIN FOR TIRE CHAINS
Filed March 10, 1950

INVENTOR.
HENRY ST. PIERRE
BY Charles R. Fay
ATTORNEY

Patented July 1, 1952

2,601,883

UNITED STATES PATENT OFFICE 2,601,883

CROSS CHAIN FOR TIRE CHAINS

Henry St. Pierre, Worcester, Mass.

Application March 10, 1950, Serial No. 148,775

11 Claims. (Cl. 152—245)

This invention relates to new and improved cross chain for tire chains and emergency units, and the principal object of the invention resides in the provision of especially constructed, long wearing, anti-friction elements disposed on the separate twist links of the cross chain, said elements each comprising a generally dished or conical body provided with outstanding sharp edges and points for engaging the ground, said elements extending generally to one side only of the chain and each having a tapering cross section so as to provide a maximum of metal where needed most to provide extremely long wear and at the same time providing a thinner part of the element sufficient area for welding or otherwise fastening the elements to the individual links of the chain.

Another object of the invention includes the provision of extra long wearing ground engaging elements to be applied to the twisted links comprising the cross chain of a tire chain, the construction of the elements being such as to provide a maximum of metal at the points of greatest wear with less metal at the points of little or no wear, i. e., at the points where the devices are welded onto the chain links, so that maximum wear may be had for a minimum of metal used.

Other objects and advantages of the invention will appear hereinafter.

Reference is to be had to the accompanying drawings in which

Each of the links 10 is a twisted chain link such as is commonly used in cross chains of tire chains and emergency units for automotive vehicles. These chains are connected at their ends to the side chains or buckles and lie transversely of the tire tread to accomplish the purpose of providing non-skid means for adverse road conditions as is well known in the art.

Figure 3:
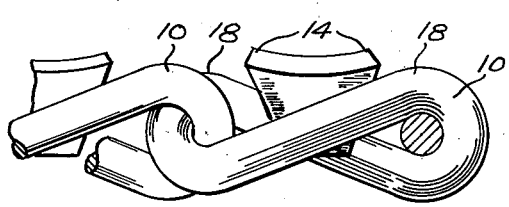
Fig. 3 is a side view thereof.
Figure 5:
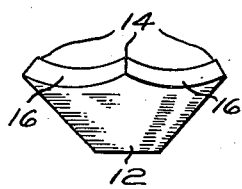
Fig. 5 is a view in elevation of one of the ground engaging elements.
Figure 8:
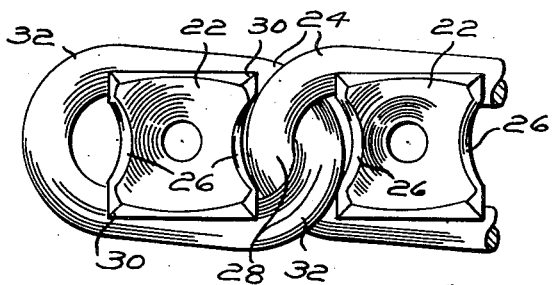
Fig. 8 shows a further modification.

The present invention contemplates the provision of dished, conical shaped reinforcement elements generally indicated at 12. These elements are preferably punched out from square stock and by being drawn down, provide a series of sharp points 14 as is best seen in Figs. 3 and 5. Each point is joined to the next point by a concave, relatively sharp edge portion 16.

Figure 1:
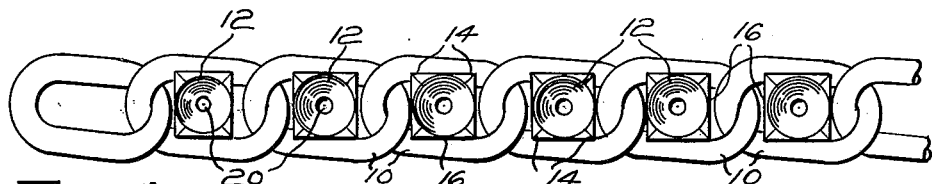
Fig. 1 is a top plan view of a cross chain of a tire chain having the novel elements applied thereto.
Figure 2:
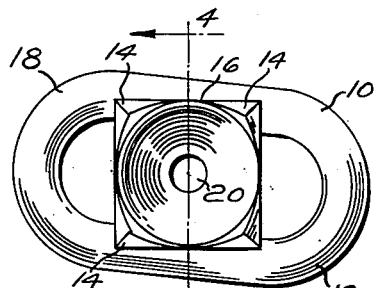
Fig. 2 is an enlarged view of one of the links of the cross chain.

It will be seen that these points and edge portions will dig into the ground or ice and provide for extremely good traction; but the invention goes beyond this conception and provides for the points 14 to be located as near as possible to the highest parts 18 of the individual chain links 10. This construction provides for the longest wear possible under any conditions because the high points 14, engaging the ground first, are worn down first, but due to the fact that they extend outwardly or upwardly, see Fig. 5, they protect the high points 18 of the links 10 for as long a time as is reasonably possible. For this reason, the elements 12 are canted slightly with respect to the twisted links as clearly shown in Fig. 2.

Figure 4:
Fig. 4 is a section on line 4—4 of Fig. 2.

Additionally, however, the anti-friction elements 12 are conical in shape and hollow and taper down to a bottom hole 20, see Fig. 4, and thus provide a maximum of metal at the points 14 and edges 16 and a minimum of metal where it is not needed at the bottom 20. However, the minimum of metal at the bottoms of the conical elements 12 is sufficient for welding to the runs of the chain.

It will be seen that this invention provides the ultimate in long wearing chains which, at the same time, provide for the best anti-friction function because of the sharp points and edges. The weight of the metal is placed exactly where it functions the most sufficiently and for the longest period of time, and therefore, the present chain provides a longer wearing chain which costs no more to manufacture than more conventional types of reinforced chain.

Figure 6:
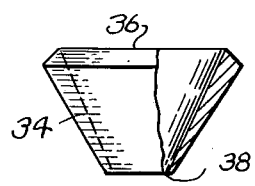
Fig. 6 is a view in side elevation of a modification thereof, part being in section.

In Fig. 6 there is shown similar elements 22 which, however, are elongated in the direction of the links of the individual twisted chain links 24. These devices are provided with concave ends 26 which accommodate the ends 28 of the links 24 so that these cross chains may flex but position the points 30 in a slightly more advantageous position than those described above because the points 30 are a little closer to the high points 32 of the chain links. The invention contemplates either form disclosed.

Figure 7:
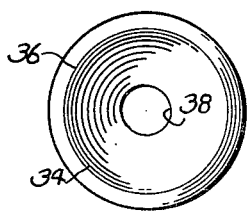
Fig. 7 is a top plan view of the device of Fig. 6.

Figs. 6 and 7 show a conical ground engaging element 34 having a circular ridge 36 at its wider end, this element tapering down to a minimum at 38 in much the same way as does the element 12. However, the form of the invention of Figs. 6 and 7 has no points as at 14, but instead presents the sharp circular edge 36. Otherwise, the device is the same as before and presents the maximum of metal where the wear occurs and the minimum of metal where little is needed.

Having thus described my invention and the advantages thereof, I do not wish to be limited to the details herein disclosed otherwise than as set forth in the claims, but what I claim is:

1. Cross chain for tire chains comprising reinforcing elements secured to the links of the cross chain, each said element comprising a hollow conical body having outstanding ground engaging points at the broad end thereof, said conical elements having a generally square outline at the broad end thereof, the sides of the square outline portion being canted slightly relative to the longer axis of the link to which it is secured.

2. A cross chain for a tire chain comprising links and a reinforcing element for certain of the links of the cross chain, each said element being conic in shape and each element tapering down from a maximum thickness at the wider end thereof to a minimum at the narrow end thereof, the wider end of the element being located to engage the ground.

3. The combination of an anti-skid link with a reinforcing element, said element having a hollow conic shape and the thickness of the wall thereof varying from a maximum at the wider end to a minimum at the narrow end, said element being secured to the link between the runs thereof, the wider end of the element being larger than the distance between the runs of the link and extending outwardly thereof to engage the ground.

4. A reinforced chain link for the cross chain of a tire chain comprising a reinforcing element on the chain link, said element having a hollow conic shape and the thickness of the wall thereof varying from a maximum at the wider end to a minimum at the narrow end, said element being secured to the link between the runs thereof, the wider end of the element being larger than the distance between the runs of the link, and outstanding points at the wider end of the element.

5. A reinforcing element for a chain link, said element having a hollow conic shape and the thickness of the wall thereof varying from a maximum at the wider end to a minimum at the narrow end, said element adapted to be secured to a link between the runs thereof, the wider end of the element being larger than the distance between the runs of the link, and a continuous sharp outstanding ridge at the wider end of the element to engage the ground.

6. A cross chain for tire chains comprising links and reinforcing elements secured to the links, each element being hollow and conical with the broader end thereof relatively thick and forming the ground-engaging portion, the thickness thereof tapering down therefrom to a minimum at the narrow end thereof, the latter being secured to the runs of the respective links.

7. A cross chain for tire chains comprising links and reinforcing elements secured to the links, each element being hollow and conical with the broader end thereof relatively thick and forming the ground-engaging portion, the thickness thereof tapering down therefrom to a minimum at the narrow end thereof, the latter being secured to the runs of the respective links, the broader end of the reinforcing element being of a general square outline.

8. A cross chain for tire chains comprising links and reinforcing elements secured to the links, each element being hollow and conical with the broader end thereof relatively thick and forming the ground-engaging portion, the thickness thereof tapering down therefrom to a minimum at the narrow end thereof, the latter being secured to the runs of the respective links, the broader end of the reinforcing element being of a rectangular outline.

9. A cross chain for tire chains comprising links and reinforcing elements secured to the links, each element being hollow and conical with the broader end thereof relatively thick and forming the ground-engaging portion, the thickness thereof tapering down therefrom to a minimum at the narrow end thereof, the latter being secured to the runs of the respective links, the broader end of the reinforcing element being of a rectangular outline and having notches therein at opposite edges to accommodate the narrow ends of the next adjacent links.

10. A cross chain for the chain comprising twisted links and reinforcing elements secured to the twisted links of the cross chain, each element comprising a hollow conical body having its wider end for ground engaging and its narrow tapered end portion located between the runs of the respective twisted link, the broad end having a generally rectangular outline, raised points at the corner portions of said rectangular outline, the element being slightly canted relative to the longer axis of the respective link with a raised point adjacent to and in overlying relation to a raised part of the twisted link.

11. The cross chain of claim 10 including concave notches in opposite sides of the rectangular broad end of the element to accommodate the narrow ends of the next adjacent twisted links.

HENRY ST. PIERRE.

REFERENCES CITED

The following references are of record in the file of this patent:

UNITED STATES PATENTS

| Number | Name | Date |
|---|---|---|
| 1,141,735 | Weed | June 1, 1915 |
| 1,536,886 | Freeman | May 5, 1925 |
| 1,651,439 | Boyer | Dec. 6, 1927 |
| 1,733,963 | Herbert | Oct. 29, 1929 |
| 2,300,383 | Haynes | Oct. 27, 1942 |
| 2,538,046 | St. Pierre | Jan. 16, 1951 |

FOREIGN PATENTS

| Number | Country | Date |
|---|---|---|
| 56,875 | Norway | July 27, 1936 |
| 84,873 | Sweden | Nov. 12, 1935 |